(12) United States Patent
Yashar et al.

(10) Patent No.: US 7,306,473 B2
(45) Date of Patent: Dec. 11, 2007

(54) THREE CAM BAIL LATCH DEVICE AND METHOD

(75) Inventors: Frank David Yashar, Sunnyvale, CA (US); John P. Wai, Los Altos, CA (US); Lin Zhang, Fremont, CA (US)

(73) Assignee: Opnext, Inc., Eatontown, NJ (US)

( * ) Notice: Subject to any disclaimer, the term of this patent is extended or adjusted under 35 U.S.C. 154(b) by 199 days.

(21) Appl. No.: 11/142,016

(22) Filed: May 31, 2005

(65) Prior Publication Data

US 2006/0269191 A1    Nov. 30, 2006

(51) Int. Cl.
*H01R 13/627*        (2006.01)
(52) U.S. Cl. ........................... 439/352; 439/372

(58) Field of Classification Search ................ 439/352, 439/372, 157, 356, 296, 160; 361/687, 728; 385/92, 76, 55
See application file for complete search history.

(56) References Cited

U.S. PATENT DOCUMENTS

| 6,494,623 | B1 * | 12/2002 | Ahrens et al. | 385/76 |
| 6,644,991 | B2 * | 11/2003 | Martin | 439/157 |
| 7,100,240 | B2 * | 9/2006 | Amano | 16/303 |

* cited by examiner

*Primary Examiner*—Alexander Gilman
(74) *Attorney, Agent, or Firm*—Finnegan, Henderson, Farabow, Garrett & Dunner, L.L.P.

(57) ABSTRACT

The present invention provides a three cam bail latch system and a method for disconnecting an electronic component from a port using the three cam bail latch system.

2 Claims, 12 Drawing Sheets

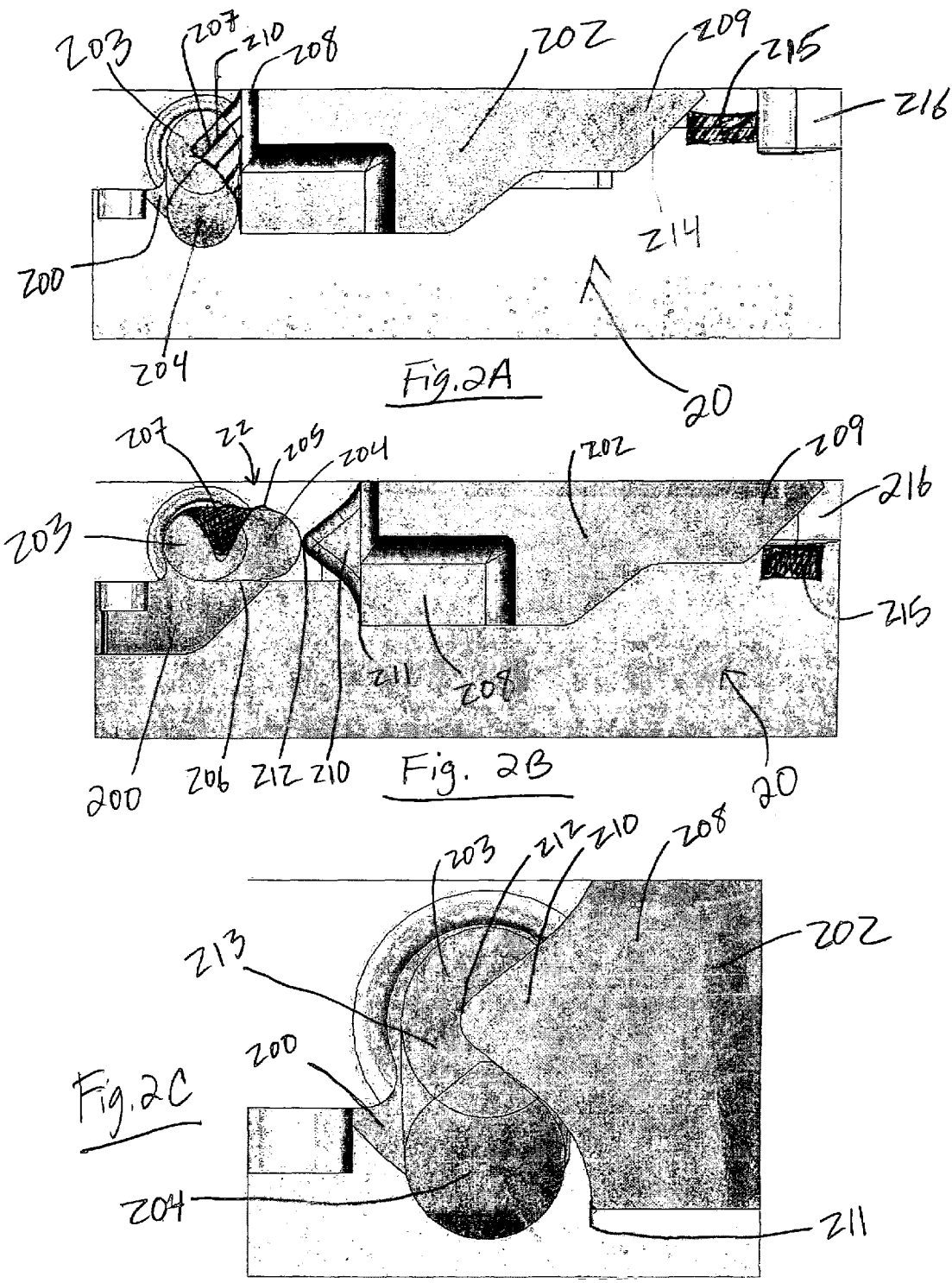

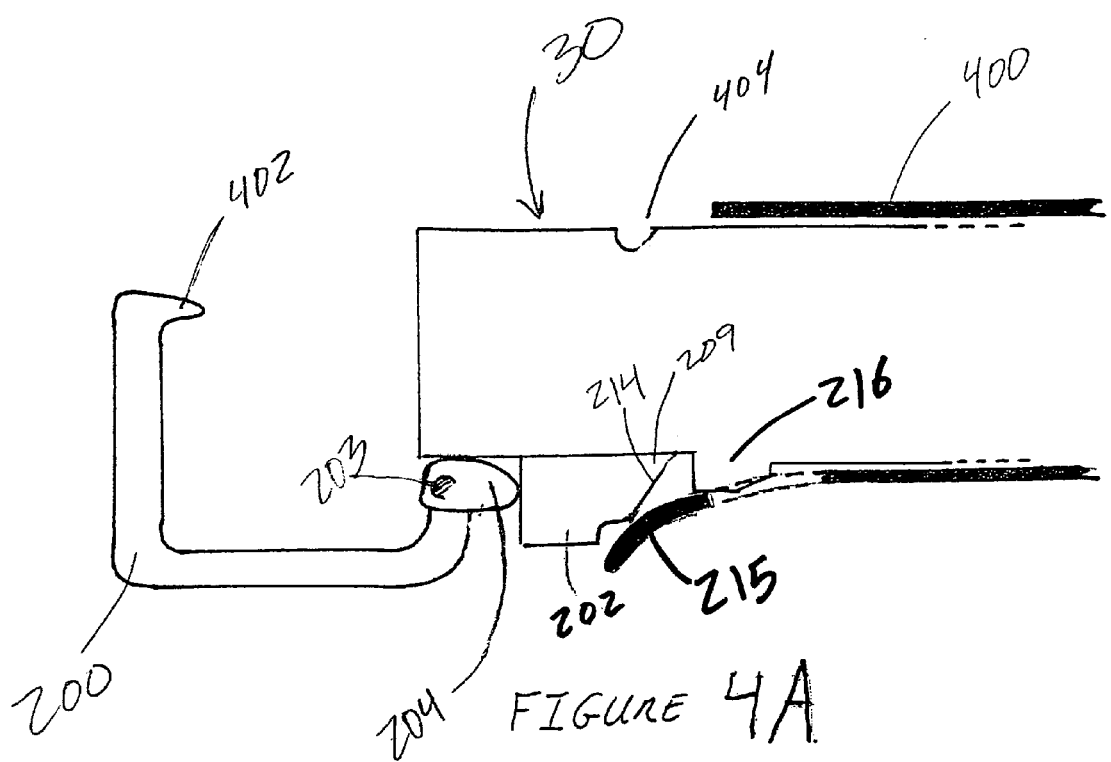

THREE CAM BAIL LATCH DEVICE AND METHOD

FIELD

The present disclosure relates to a three cam bail latch device and method, and more particularly to a three cam bail latch device for use in an electro-optic data transfer apparatus.

INTRODUCTION

Computer networks typically utilize some network devices that facilitate electronic data communication. One exemplary network device is a switch, which is a device that can filter and forward packets between local area network (LAN) segments. Various switches are known in the art, for example one such exemplary switch is a Cisco Catalyst 3560 Switch, made by Cisco Systems, Inc. of San Jose, Calif.

Network devices typically include some ports that allow for the network device to physically connect to various intermediary electronic components. One exemplary electronic component is an optical transceiver that converts data in the form of electrical signals into optical signals for transmission through optical fibers. The ports typically conform to some standards that govern the interoperability of the network devices with the electronic components. For example, one such standard in electro-optic transmissions is the small form-factor pluggable (SFP) standard. As a result, several different entities can manufacture ports that comply with the governing standard.

However, some differences exist among and between manufacturers that can impact the reliability of the connection process. For example, variances in the manufacturing process can create differences in the measurements from those that are specified by the applicable standard, thus creating a situation in which some, but not all, components reliably connect to some ports.

There are many ways in which electronic components can be extracted, or disconnected, from corresponding ports. One such exemplary latching mechanism is a bail latch mechanism such as the one described in U.S. patent application Ser. No. 10/364,685 to Arciniegas, et al., which is hereby incorporated by reference in its entirety. Typical bail latch mechanisms allow for the user to pull on a bail, or arm, which rotates a single cam, or lever. The single cam then moves a slider to contact a latch, which facilitates the disconnection of the electronic component from the port.

In particular, as illustrated in FIGS. 1A and 1B, a conventional cam system 10 typically includes one simple cam 100. The cam 100 is attached to a bail 102 such that rotation of the bail correspondingly rotates the cam 100. The cam 100 is in contact with a slider 104 such that rotation of,the cam 100 provides a linear movement of the slider 104 a certain distance 106. However, the linear distance 106 provided by the rotation of the conventional cam system 10 may not be great enough to detach the electronic, or optical, component from the port. This is because some manufacturers provide enclosures wherein the distance needed to detach the electronic component from the port is greater than the distance 106 provided by the conventional cam system 10. Thus, there is a need for a cam system that provides for a greater linear travel of the slider yet still complies with the requirements of the particular governing standard such as, e.g., the SFP standard.

SUMMARY

According to some embodiments, a three cam bail latch system comprises a first cam, a second cam attached to the first cam, wherein the second cam defines a relief on an upper surface of the second cam, a third cam in contact with the second cam, wherein the third cam is configured to at least partially fit within the relief, a bail coupled to the first cam, and a slider attached to the third cam at a proximate end of the slider, wherein the slider comprises an angled portion at a distal end of the slider that is adapted to contact a latch.

According to some embodiments, a three cam bail latch comprises a first cam, a second cam attached to the first cam, wherein the second cam defines a relief on an upper surface of the second cam, and a third cam in contact with the second cam, wherein the third cam is configured to at least partially fit within the relief, and wherein the third cam is attached to a slider According to some embodiments, a method for disconnecting an electronic component from a port using a three cam bail latch system comprises rotating a bail, wherein the bail is attached to a first cam, rotating the first cam, rotating a second cam that is attached to the first cam, wherein the second cam is in contact with at least a portion of a third cam, moving a slider that is attached to the third cam at a proximate end of the slider, wherein the slider comprises an angled portion on a distal end of the slider, and moving the angled portion to contact a retaining piece located on the port to disconnect the electronic component from the port.

DESCRIPTION OF SOME EMBODIMENTS

Figure 1A:
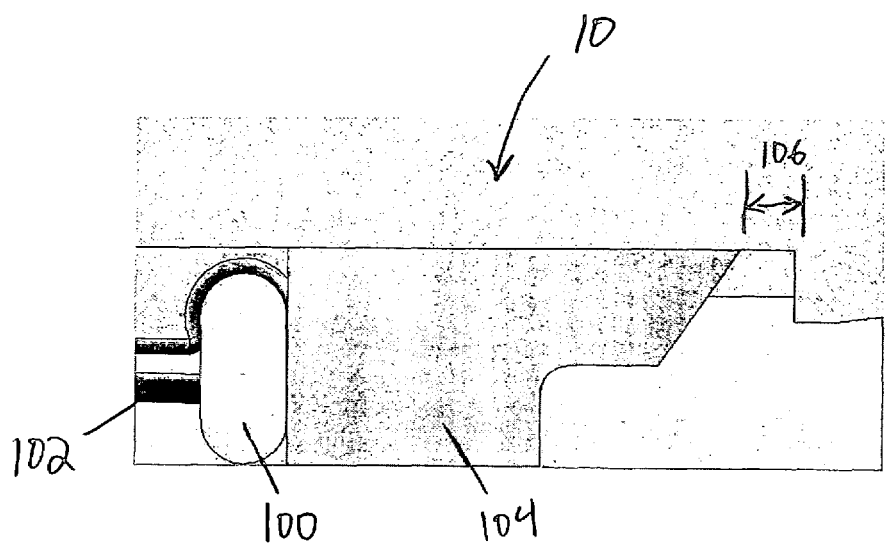
FIG. 1A illustrates a cross-sectional side view of a conventional cam system, including a conventional cam device and a conventional slider, in a retracted or closed position, according to some aspects.

In the present disclosure, the use of the singular includes the plural unless specifically stated otherwise. In the present disclosure, the use of "or" means "and/or" unless otherwise stated. Furthermore, the use of the term "including," as well as other forms, such as "includes" or "included," is not limiting. Also, terms such as "element" or "component" encompass both elements and components comprising one unit and elements and components that comprise more than one subunit unless specifically stated otherwise. Wherever possible, the same reference numbers will be used throughout the drawings to refer to the same or like parts.

The section headings used herein are for organizational purposes only, and are not to be construed as limiting the subject matter described. All documents cited in this application, including, but not limited to, patents, patent applications, articles, books, and treatises, are expressly incorporated by reference in their entirety for any purpose.

In some embodiments, a three cam bail latch system can comprise various components including, but not limited to, a first cam, a second cam, a third cam, a bail (or arm), and a slider. As will be described in more detail below, some three cam bail latch system components can be assembled together and coupled to an electronic component such as, e.g., a SFP-compliant optical transceiver. The three cam bail latch system can, in some embodiments, provide for extended movement of the slider with respect to, for example, the port that the electronic component is placed into while still complying with the applicable governing standards. As a result, the three cam bail latch system can facilitate the reliable connection and disconnection of an electronic component with a port while adhering to the physical dimensions required of some governing standards.

In some embodiments, as illustrated in FIGS. 2A-2E, a three cam bail latch system ("three cam system") 20 can comprise a first cam 203, a second cam 204, a third cam 210, a bail 200, and a slider 202. As is discussed in more detail below, the bail 200 can be coupled to the first cam 203. The second cam 204 can contact at least a portion of the slider 202. The slider 202 can move between a retracted or folded position (see, e.g., FIG. 2A) and an extended or opened position (see, e.g., FIG. 2B). The movement of the slider between a folded and opened position can facilitate the connection and removal of the electronic component 30 (see, e.g., FIG. 3A) to the port (see, e.g., FIGS. 4A, 4B, and 4D, "400"). The various components can be made from one or more exemplary materials, including but not limited to zinc, titanium, stainless steel, other metal alloys, and/or plastics, and the like.

Figures 2D, 2E:
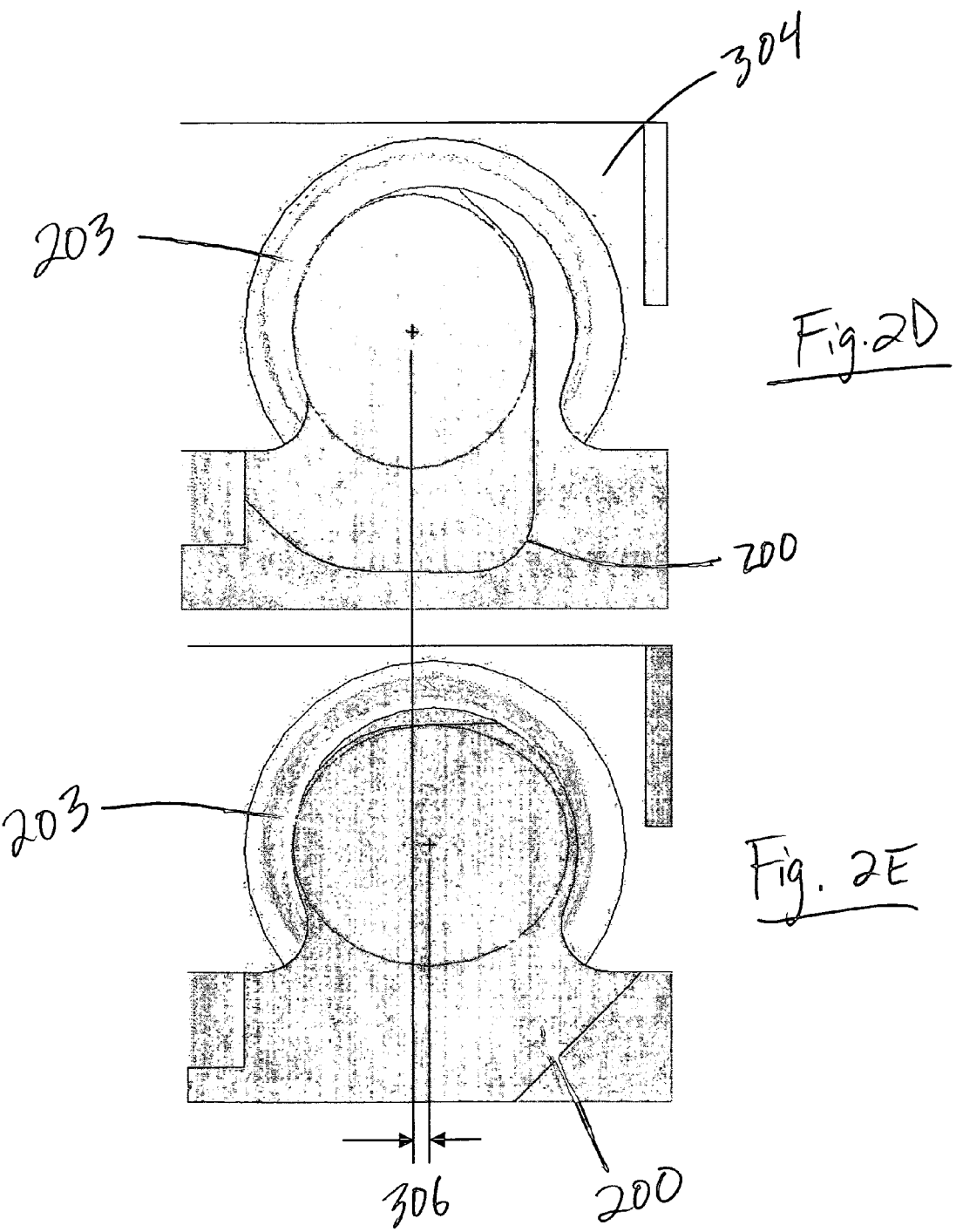
FIG. 2D illustrates a cross-sectional side view of a first cam within a housing, in a retracted or folded position, according to some embodiments of the present invention.
FIG. 2E illustrates a cross-sectional side view of a first cam within a housing, in an extended or opened position, according to some embodiments of the present invention.
Figure 3A:
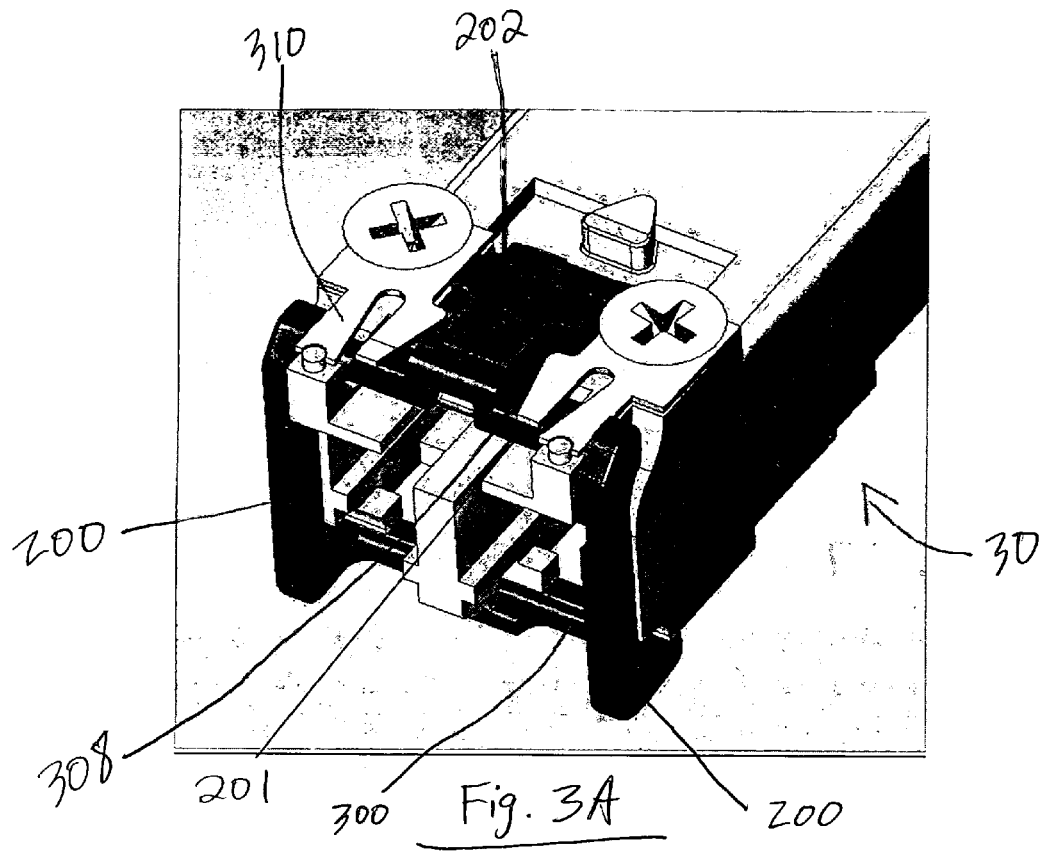
FIG. 3A illustrates a perspective view of the bottom of an electronic component including a three cam bail latch system, according to some embodiments of the present invention.
Figure 3B:
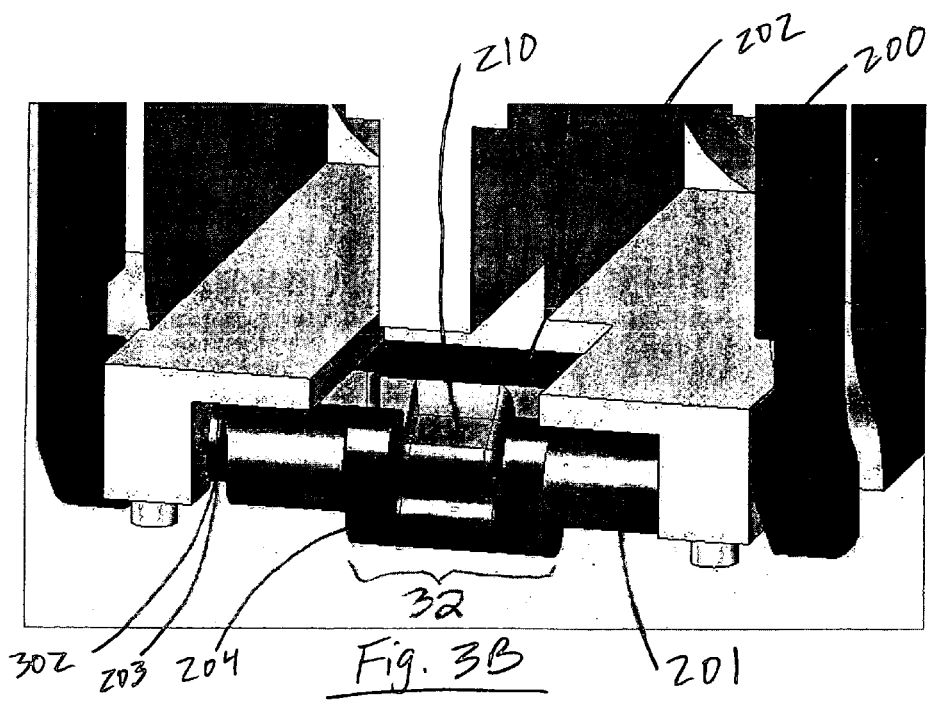
FIG. 3B illustrates a perspective view of the front of an electronic component including a three,cam bail latch system showing the third cam occupying the space or relief defined on the second cam, according to some embodiments of the present invention.
Figure 3C:
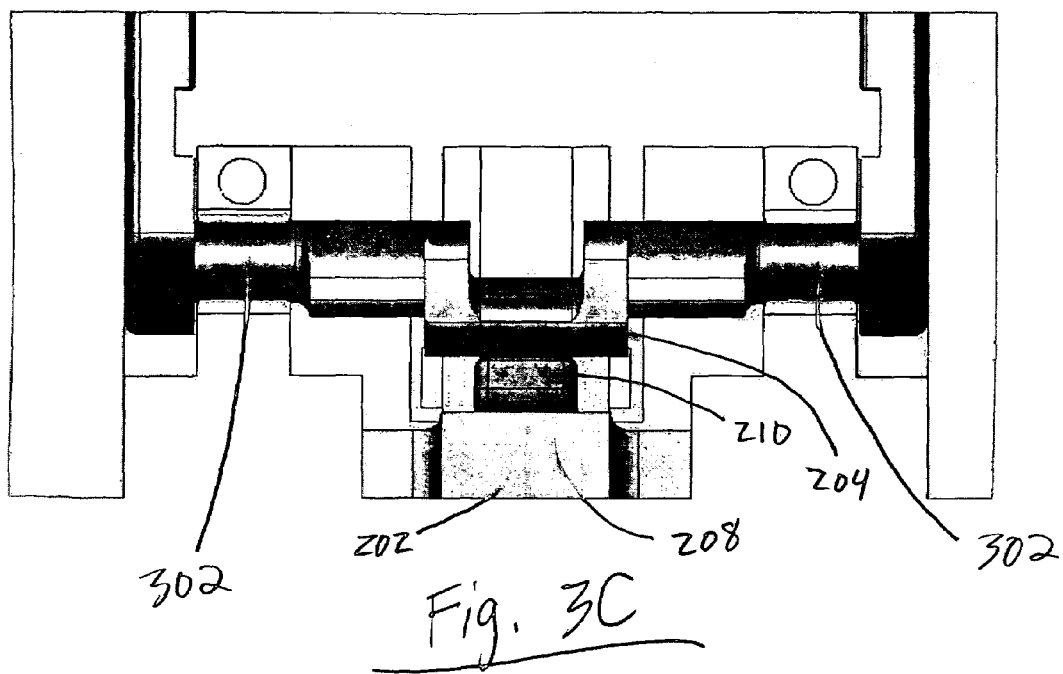
FIG. 3C illustrates a bottom view of an electronic component including a three cam bail latch system in an extended or opened configuration, according to some embodiments of the present invention.

In some embodiments, as illustrated in FIGS. 3B-3C, the second cam 204 can be located in a central section 32 and the first cam 203 can be located in an outer section 302. In some embodiments, the third cam 210 can be located at or near the central section 32 so as to correspond to the location of the second cam 204. As is explained in more detail below, all three cams can facilitate a greater linear movement of the slider 202 when rotated then is conventionally obtained. As is illustrated in some embodiments in FIGS. 2D-2E, the first cam 203 can have a substantially elliptical, or oval, cross-sectional shape. As a result, when rotated about 90 degrees within a housing 304, the center of the first cam 203 moves horizontally a distance 306 (see, e.g., FIG. 2E).

Figure 5A:
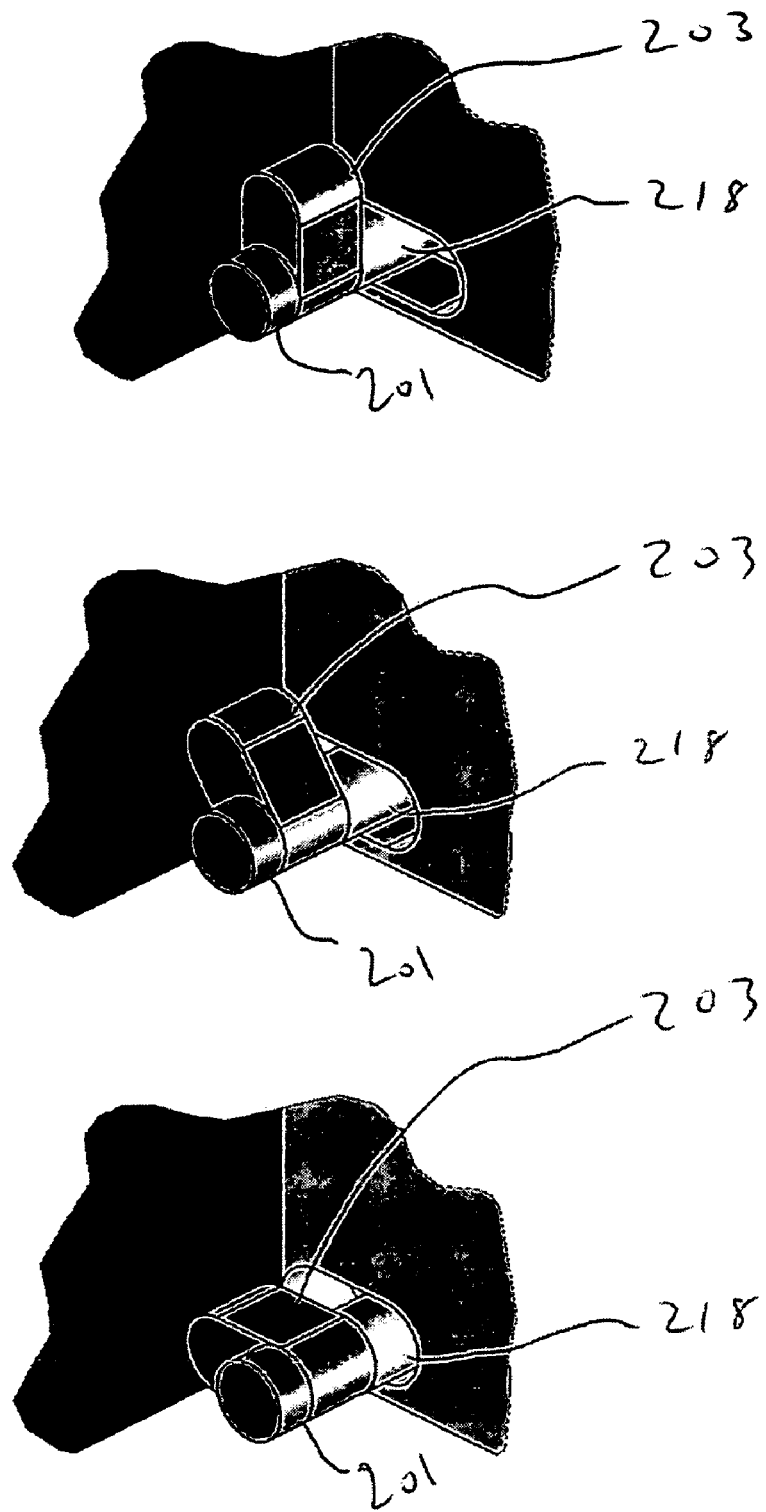
FIG. 5A illustrates a perspective view of an alternative configuration for the first cam for extended travel of the three cam bail latch system, according to some embodiments of the invention.
Figure 5B:
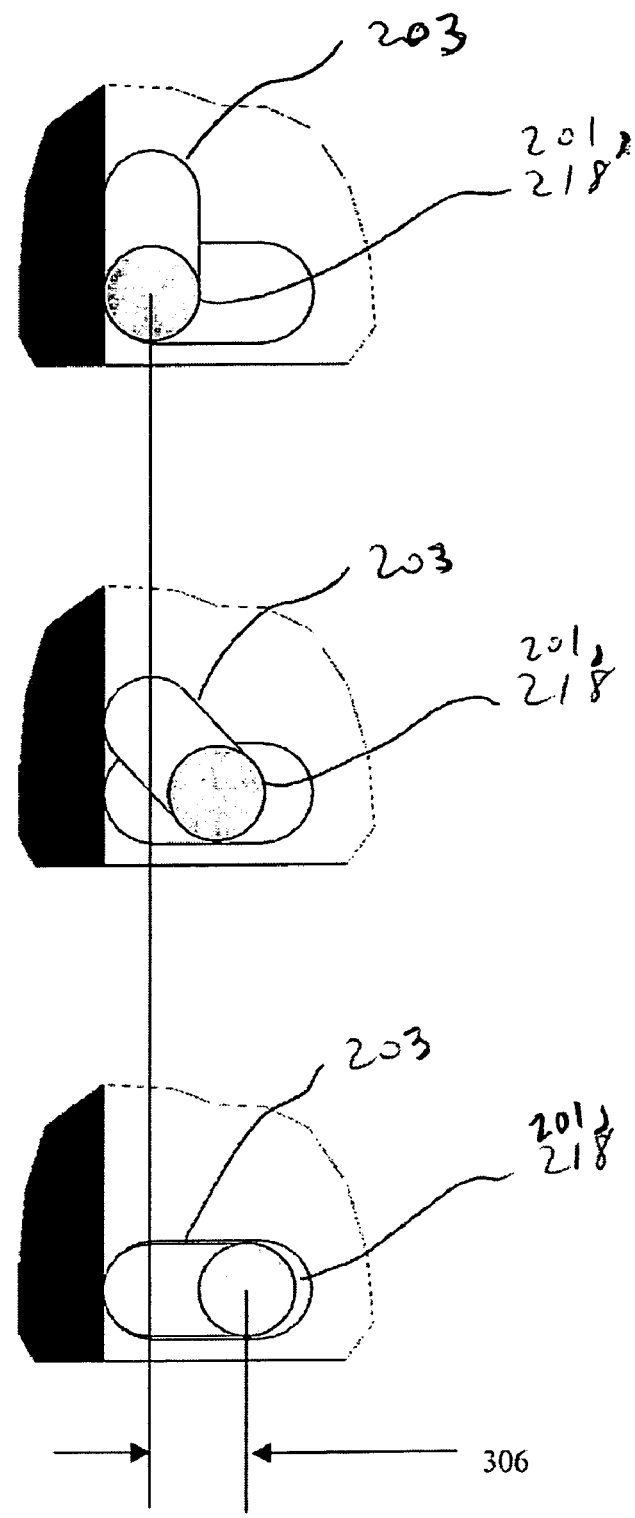
FIG. 5B illustrates a side view of an alternative configuration for the first cam for extended travel of the three cam bail latch system, according to some embodiments, of the invention.

In some embodiments, as illustrated in FIGS. 2D-2E, the first cam 203 can be incorporated as part of the pivot of the bail 200. However, FIGS. 5A and 5B illustrate the first cam physically separated from the pivot of the bail. In particular, in some embodiments the first cam 203 can linearly move forward the pivot a substantial amount. In particular, when the first cam 203 is rotated 90 degrees, the pivot 218 and rod 201 can be made to move forward a distance 306. This distance 306 can be substantially more than the distance 306 shown in FIG. 2D and FIG. 2E.

Figure 2A:
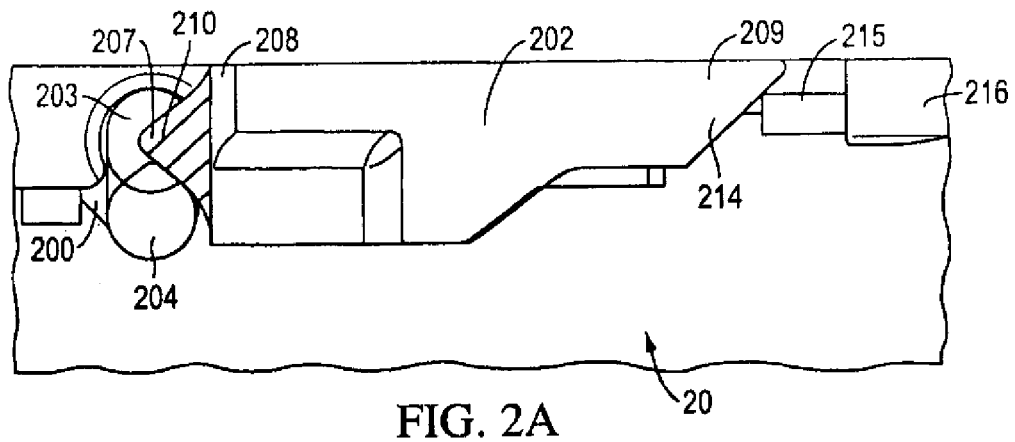
FIG. 2A illustrates a cross-sectional side view of a three cam bail latch system in a retracted or folded position, according to some embodiments of the present invention.
Figure 2B:
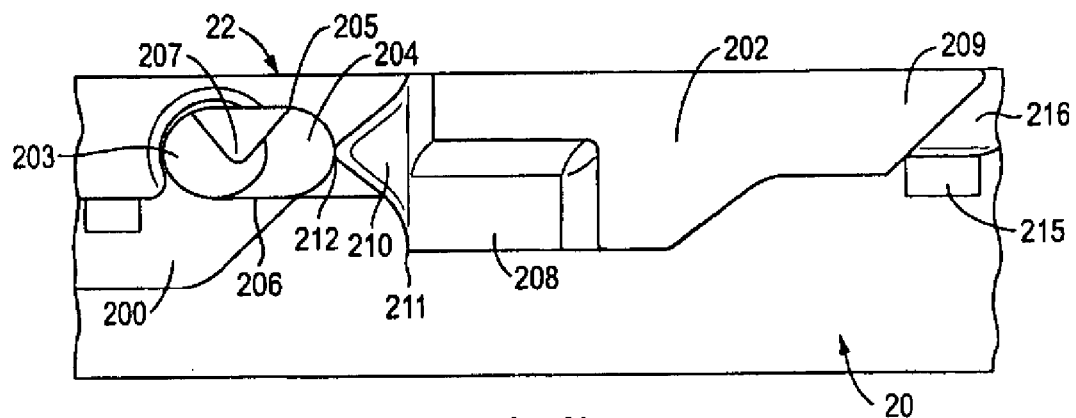
FIG. 2B illustrates a cross-sectional side view of a three cam bail latch system in an extended or opened position, according to some embodiments of the present invention.
Figure 2C:
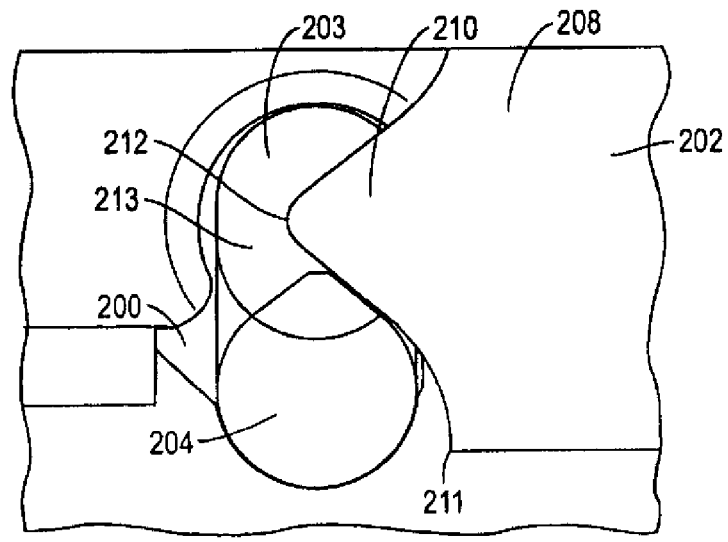
FIG. 2C illustrates a cross-sectional side view of a three cam bail latch system in a retracted or folded configuration, according to some embodiments of the present invention.
Figure 2D:
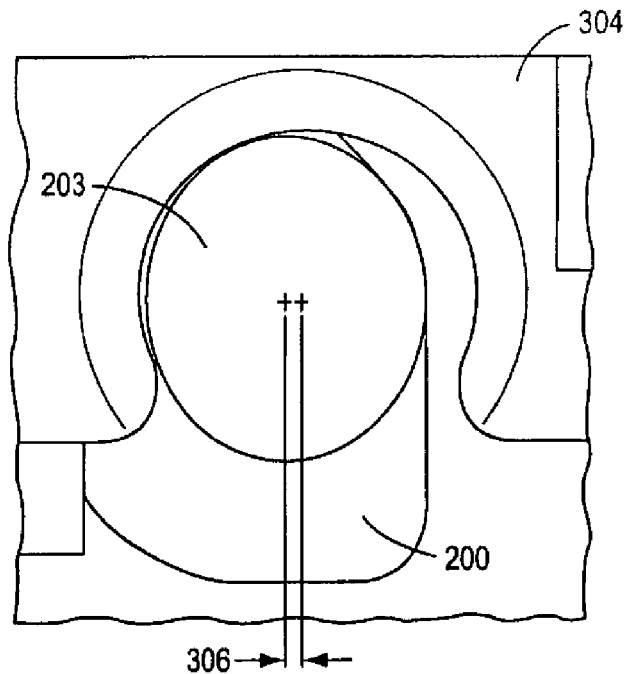
Figure 2E:
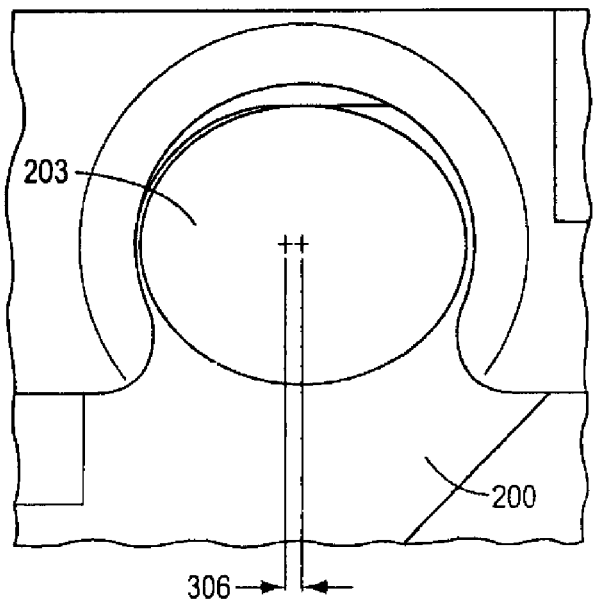
Figure 3A:
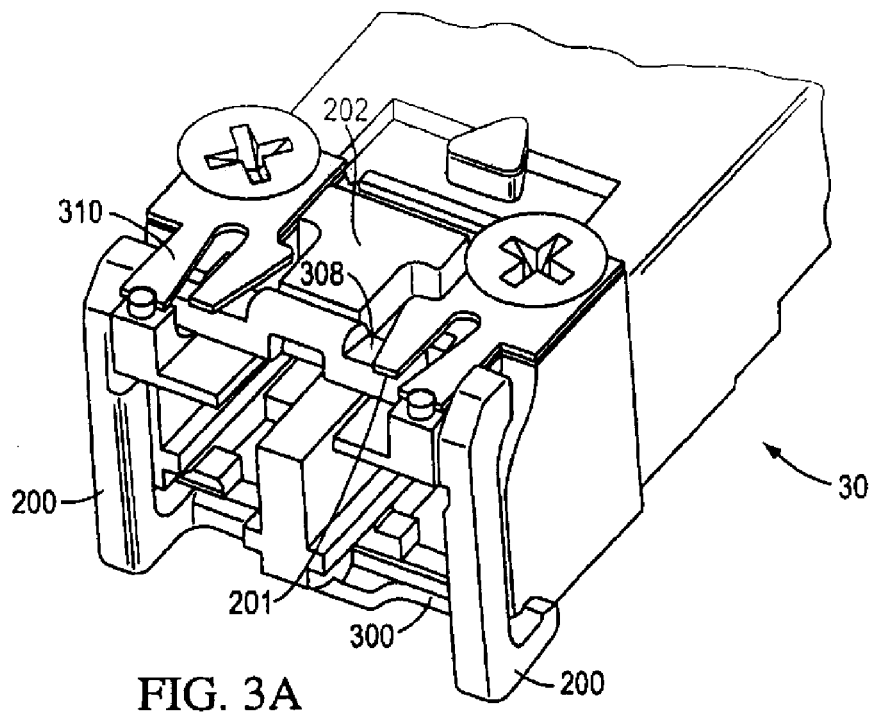
Figure 3B:
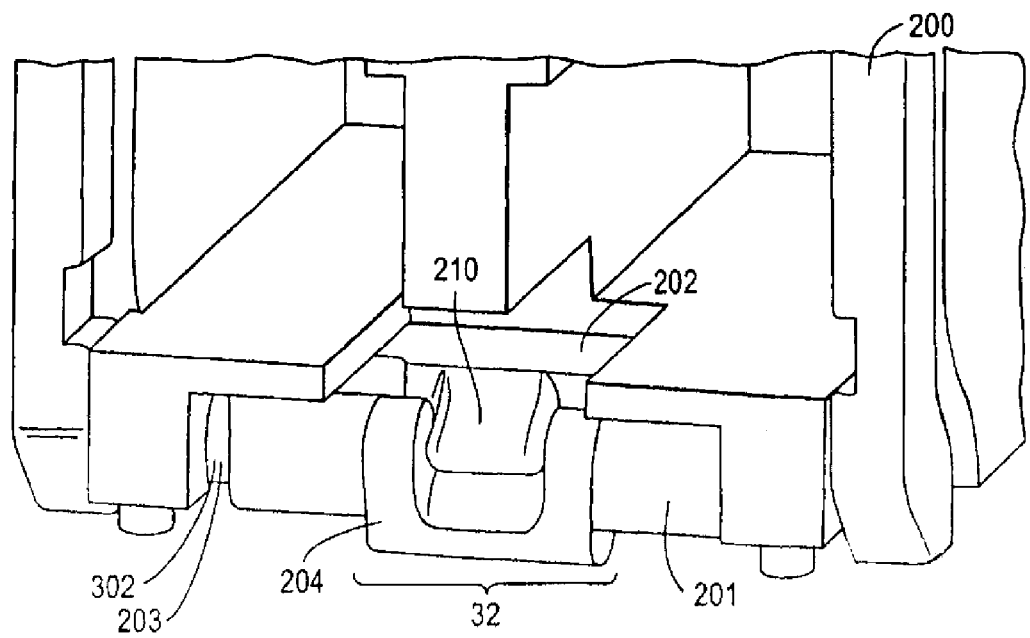
Figure 3C:
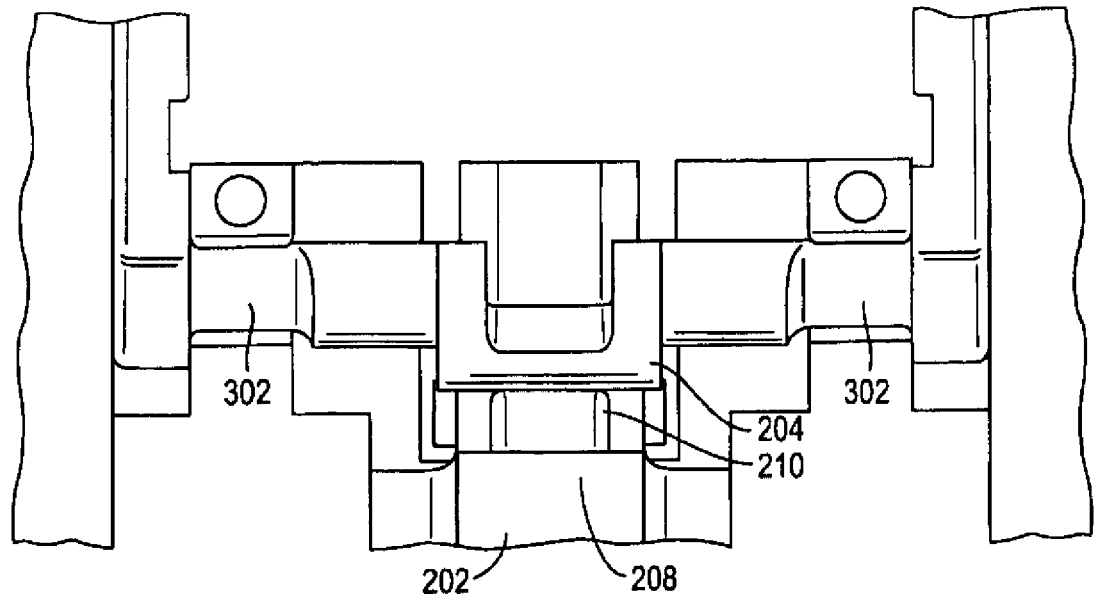

As illustrated in some embodiments in FIGS. 2A-2C, first cam 203 and the second cam 204 can be part of one piece. For example, the combination of first cam 203 and second cam 204 can be machined out of one piece of, e.g., zinc. However, in some embodiments, the first cam 203 can comprise a separate piece that can be connected to the second cam 204. In this case, the first cam 203 can connect to the second cam 204 by a number of means including, but not limited to, adhesion, magnetic attraction, mechanical interlocks, press-fits, and the like. The second cam 204 provides an eccentricity, such that rotation of the second cam 204 about the center of first cam 203 can cause an extended movement of contacting slider 202 (see, e.g., FIG. 2B).

In some embodiments, as illustrated in FIG. 2B, the second cam 204 can comprise an upper surface 205 and a lower surface 206. The second cam 204 can define a recess 207 that, in some embodiments, can be located at the upper surface 205. The recess 207 can be adapted to receive at least a portion of the third cam 210, as is described in more detail below. As illustrated in some embodiments in FIGS. 2C and 3B, the recess 207 can be in the form of a relief cutout 213 that extends from both the upper surface 205 and the lower surface 206.

In some embodiments, as illustrated in FIGS. 2A-2C, the three cam system 20 can comprise a slider 202. The slider 202 can comprise a proximate end 208 and a distal end 209. The slider can be attached to the third cam 210, located generally at the proximate end 208. As shown in some embodiments in FIG. 2C, the third cam 210 can comprise a smooth profile that substantially extends from a proximate edge 211 to an apex 212. As is shown in FIG. 3B, in some embodiments, the third cam 210 can be located in a central portion of the slider 202. However, the third cam 210 can instead be located at one or more spaced-apart areas located away from the central portion of the slider 202. In some embodiments, as illustrated in FIG. 2C, the distance between the proximate edge 211 and the apex 212 can measure approximately 1.0 mm.

Figure 6:
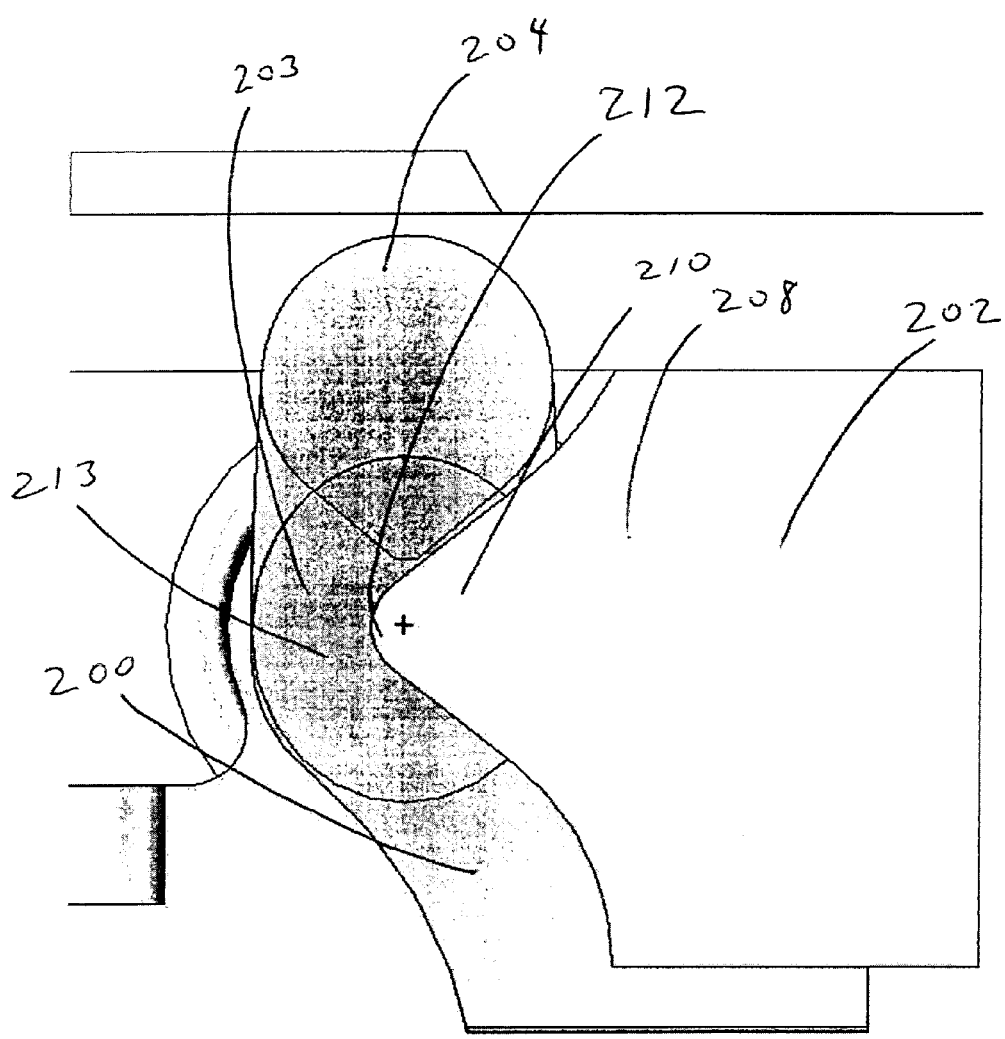
FIG. 6 illustrates a cross-sectional view of the second and third cam showing the second cam positioned above the apex of the third cam, according to some embodiments of the invention.
Figure 1A:
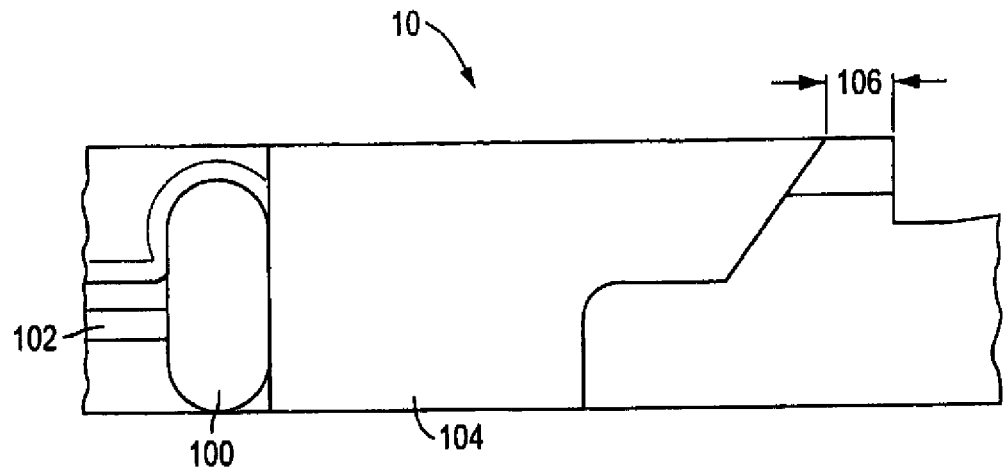
Figure 1B:
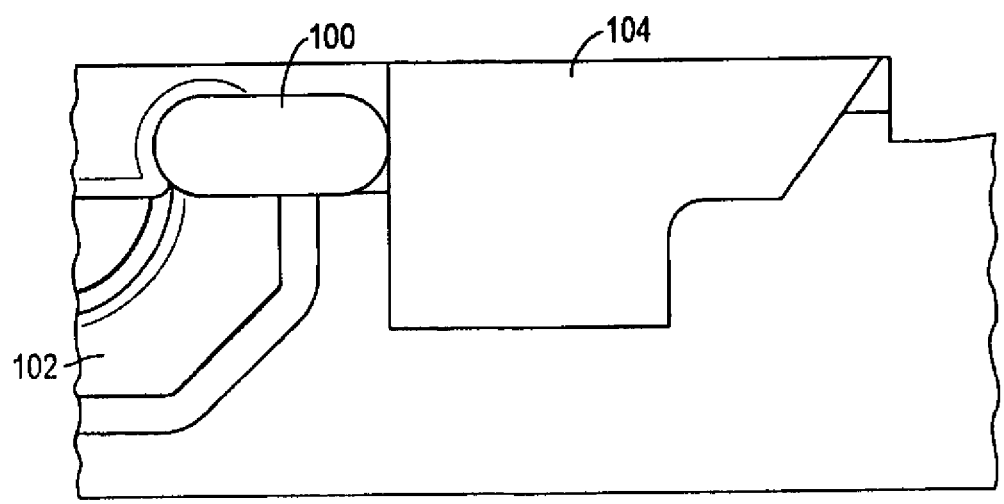

In some embodiments, as illustrated in FIGS. 2A-2C, if the third cam 210 is made approximately symmetrical above and below its apex 212, the second cam 204 can be located below the apex 212 in the retracted position as shown for example in FIG. 2A. However, in some embodiments, the second cam can be located above the apex. For example, FIG. 6 illustrates that the second cam 204 can be located above the apex 212 in the retracted position.

As illustrated in some embodiments in FIGS. 2A and 2C, the recess 207 defined by the second cam 204 can receive, or house, at least a portion of the third cam 210. As a result, this retracted, or folded, configuration wherein at least a portion of the third cam 210 is received within the recess 207 allows the three cam system 20 to be contained within a small space. Thus, the three cam system 20 can be made to comply within the spatial constraints imposed by some standards such as, for example, the SFP standard. Similarly, the third cam 210 can be received by the relief cutout 213, as is shown in some embodiments in FIGS. 2C, 3B, and 6.

Figure 4B:
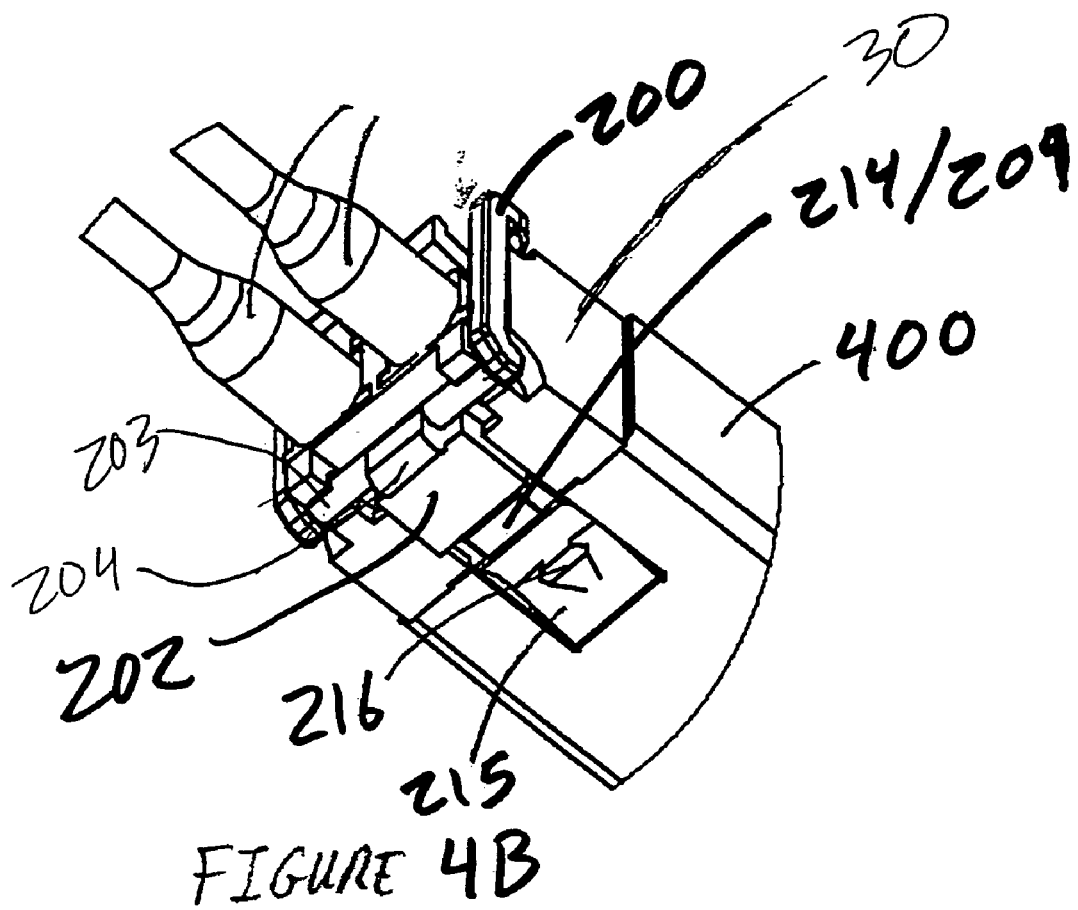
FIG. 4B illustrates a perspective view of a three cam system and an electronic component partially within a port, according to some embodiments of the present invention.
Figure 4C:
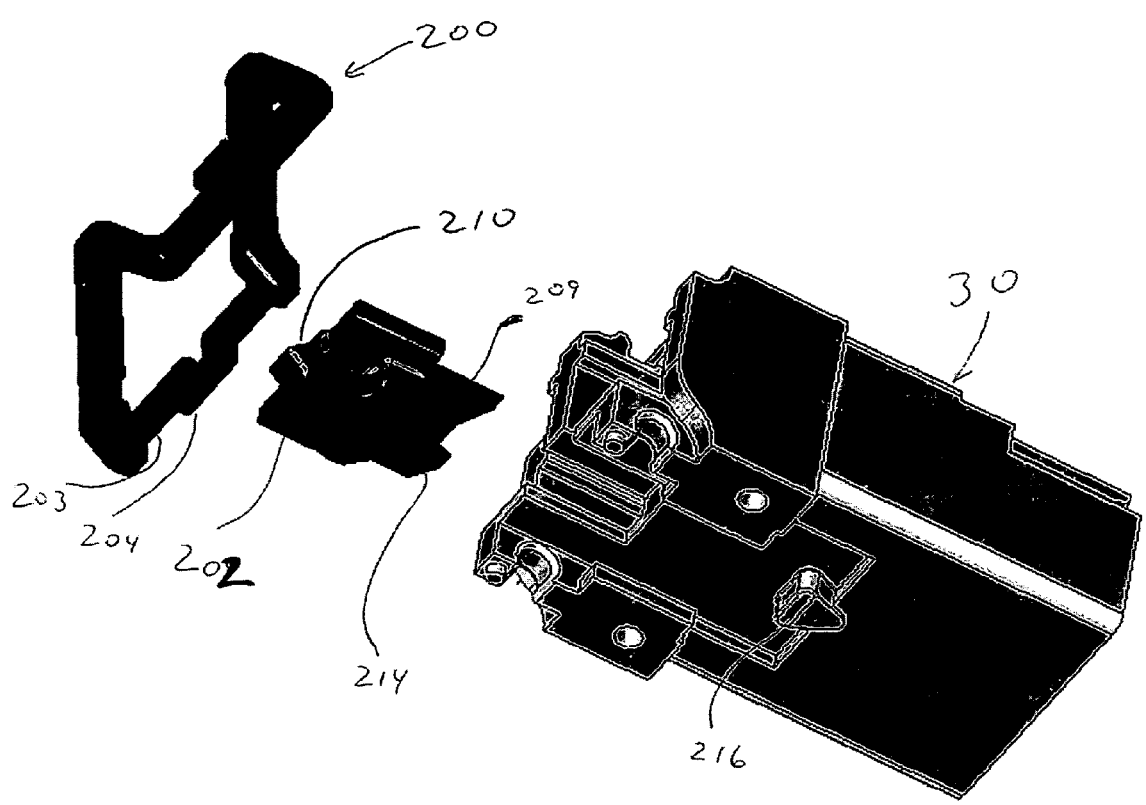
FIG. 4C illustrates an exploded perspective view of a three cam system and an electronic component, according to some embodiments of the present invention.
Figure 4D:
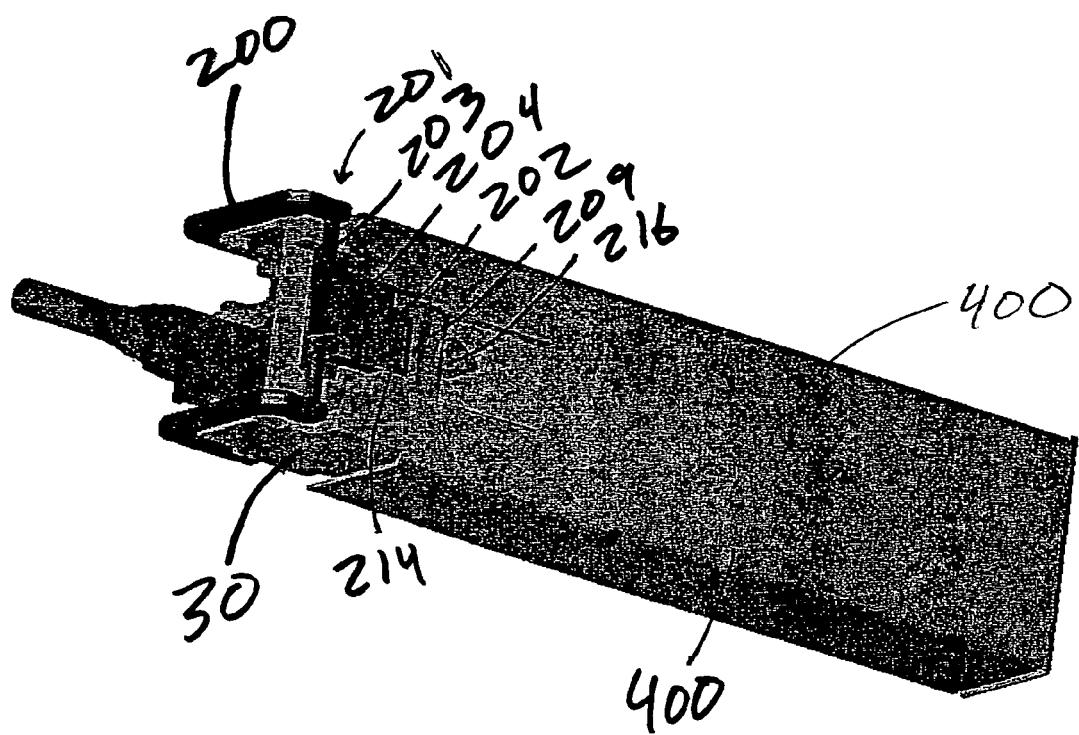
FIG. 4D illustrates a perspective bottom view of three cam system and an electronic component partially within a port, according to some embodiments of the present invention.
Figure 4A:
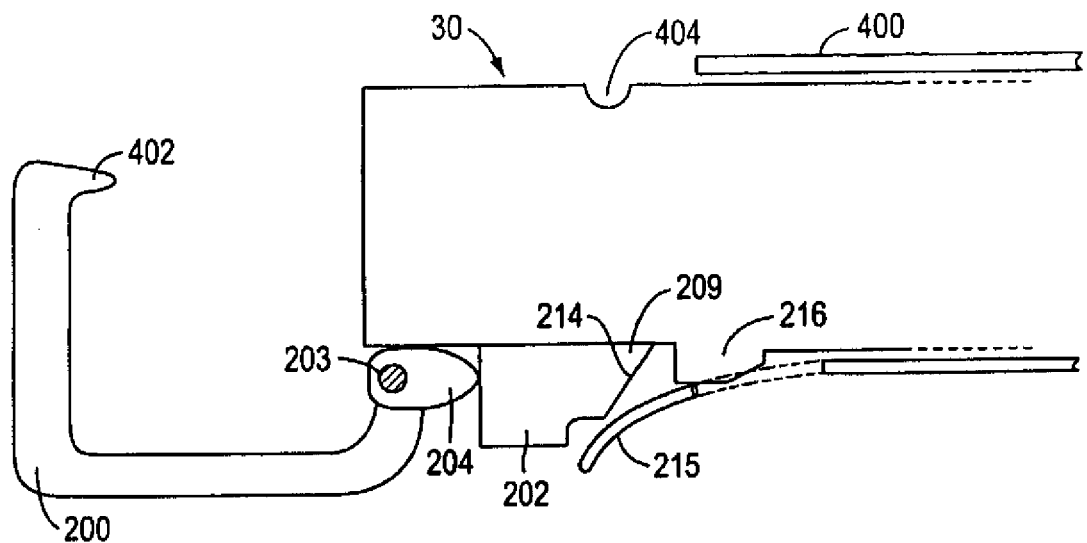
FIG. 4A illustrates a side view of a three cam system and an electronic component partially within a port, according to some embodiments of the present invention.
Figure 4B:
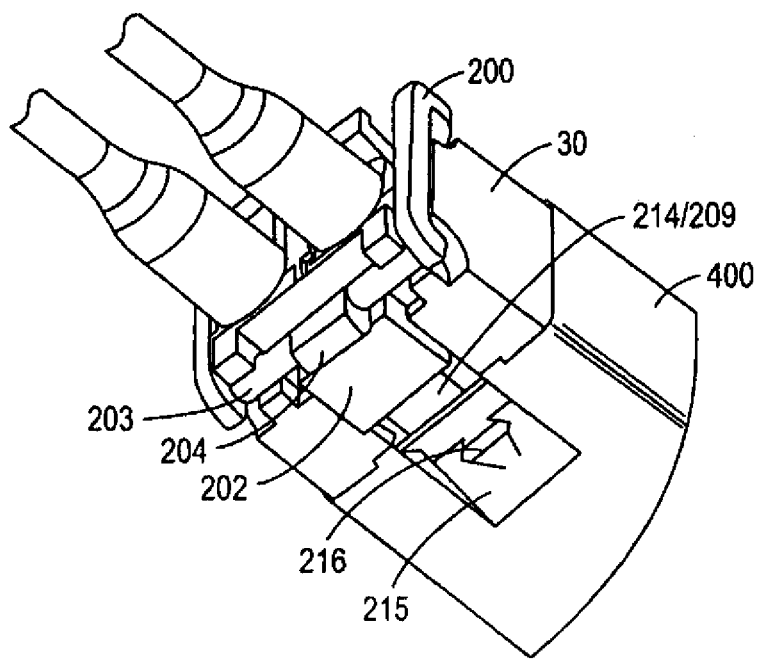
Figure 4C:
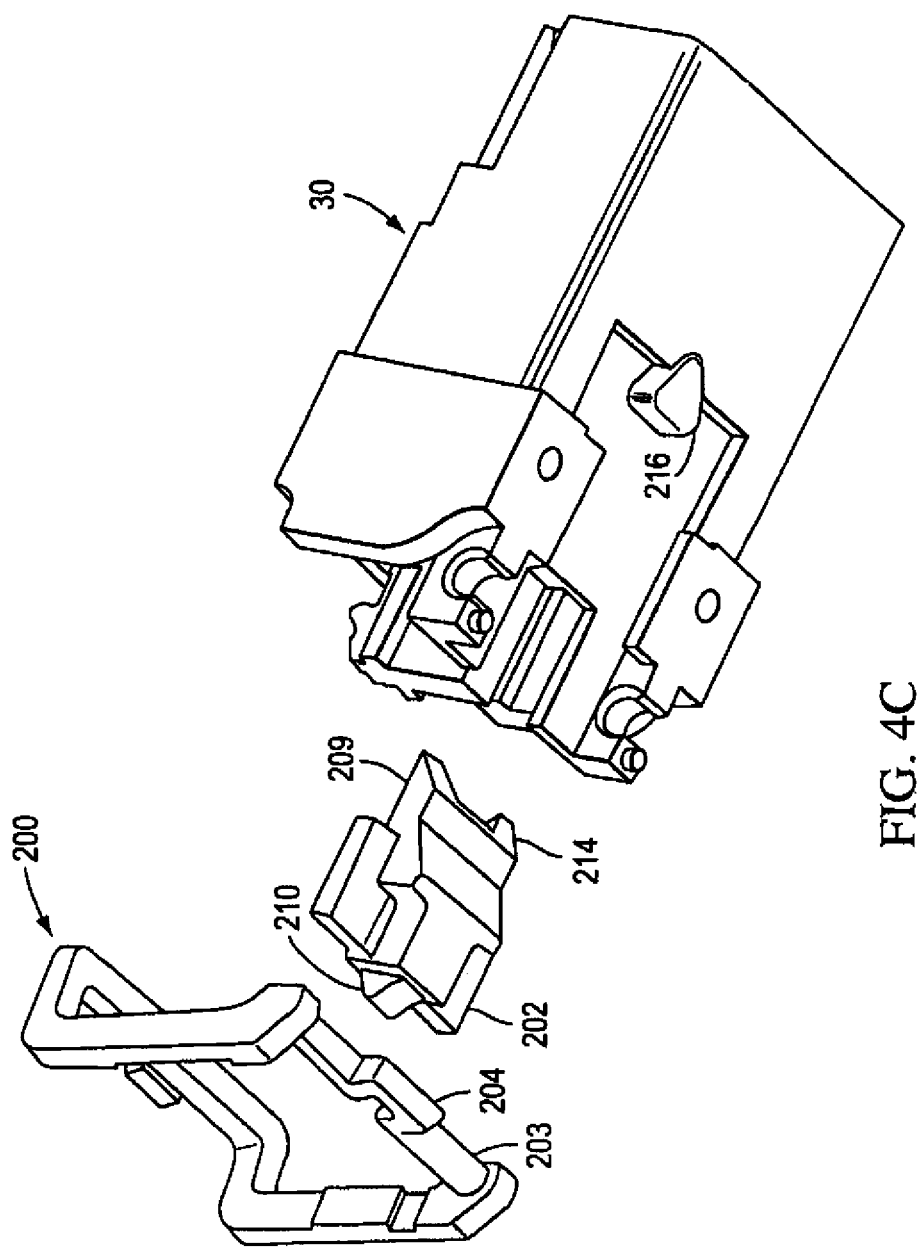
Figure 4D:
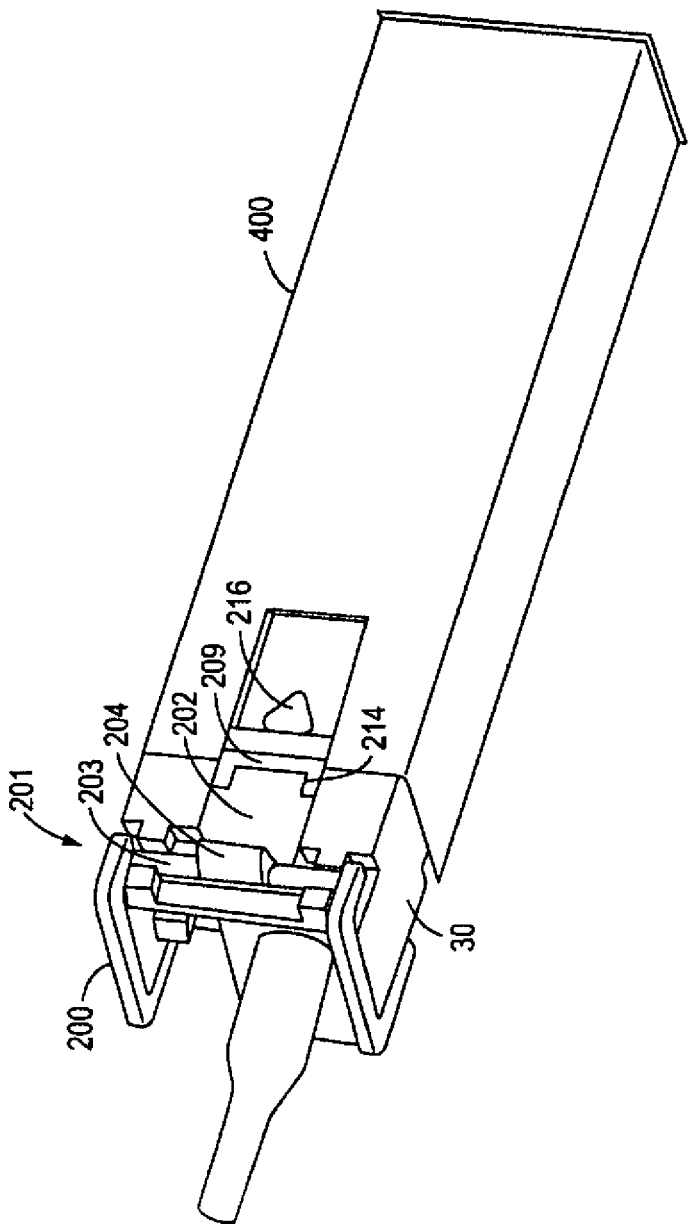
Figure 5A:
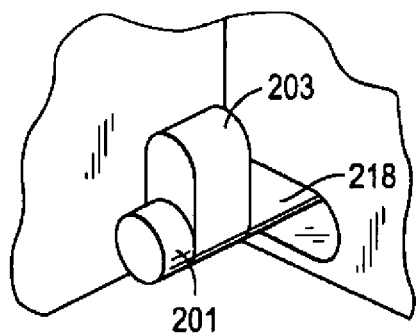
Figure 5A:
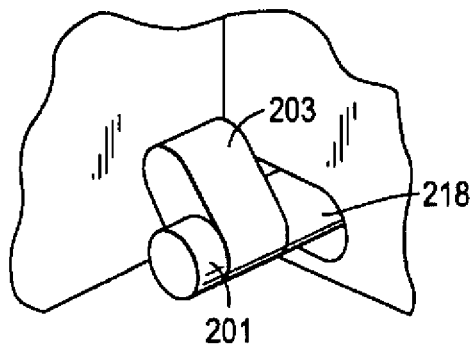
Figure 5A:
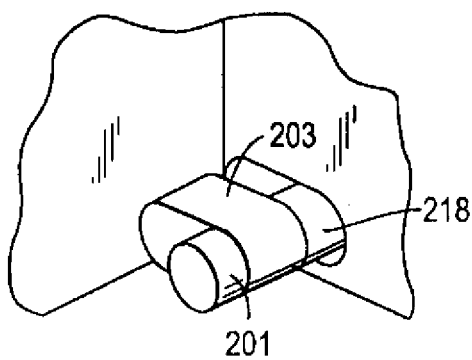
Figure 5B:
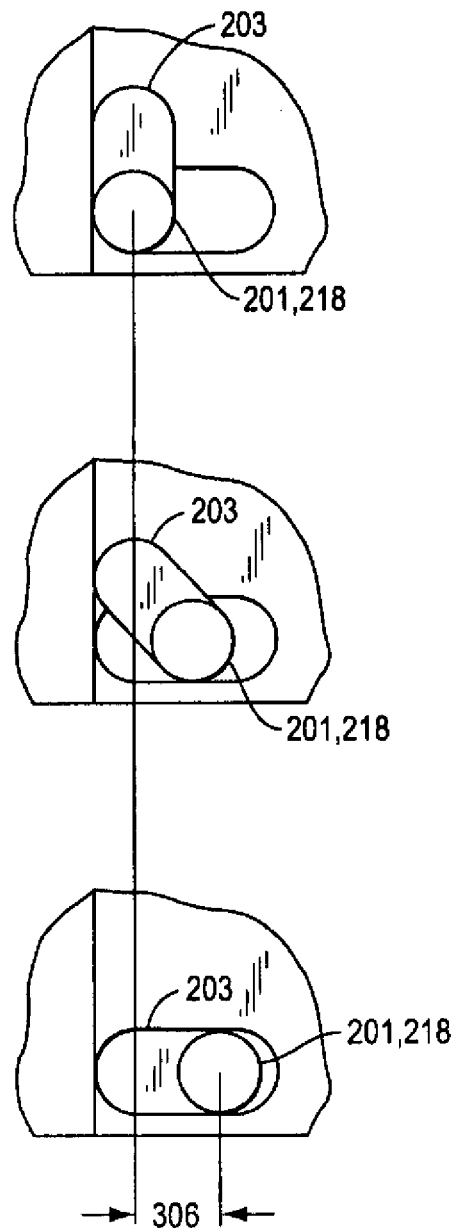
Figure 6:
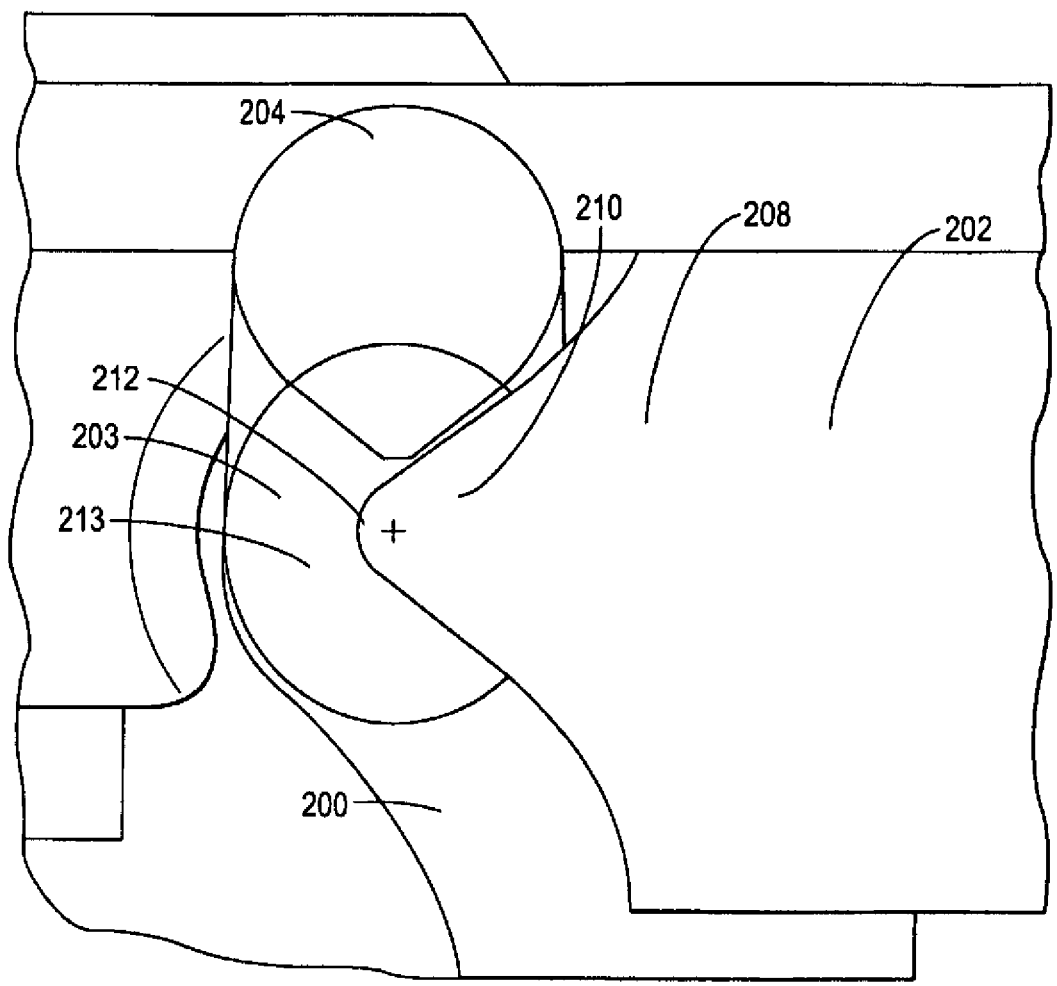

In some embodiments, as illustrated in FIGS. 2A and 4A-4D, the slider 202 can comprise an angled portion 214 located generally at the distal end 209 (see FIG. 4A). As the first and second cams 203, 204 rotate from a retracted position (e.g., FIG. 2A) to an extended position (e.g., FIG. 2B), the slider is moved generally from left to right, thus causing the angled portion 214 to further engage a latch 215 (FIG. 4A). As illustrated in FIG. 4A, the angled portion 214 can facilitate the movement of the retaining latch 215 over a raised portion or boss 216, thus releasing the electronic component 30 from a port 400.

In some embodiments, as illustrated in FIG. 3A, the three cam system 20 can comprise a bail 200. The bail 200 can attach to the three cam system 20 at either or both ends of the rod 201 (see, e.g., FIGS. 3A-3C). As illustrated in some embodiments in FIG. 3A, the bail 200 can be generally U-shaped comprising a cross member 300. The bail 200 can facilitate the rotation of the first and second cams 203, 204 with respect to the electronic component 30. For example, a user can rotate the first and second cams 203, 204 by pulling on the bail 200 at the cross member 300.

In some embodiments, various mechanisms can cause the three cam system 20 to be held into a default, or fixed position. As illustrated in some embodiments in FIG. 3A, the three cam system 20 can comprise a flat region 308 located generally on a downward surface of the rod 201. The flat region 308 can act as a surface against which a spring can push. For example, a leaf spring 310 can be fixedly attached to the electronic component 30 and can contact the flat region 308 thereby exerting a force against the flat region 308. As a result, the arm 200 can be held in place by the force exerted by the leaf spring 310 against the flat region 308 so that a larger force is needed to allow the arm 200 to rotate out of the fixed position. Another example of holding the three cam system 20 into a fixed position includes using a latch mechanism located generally at the cross member 300 of the arm 200. For example, as illustrated in FIG. 4A, a hook 402 can latch onto a cutout 404 to hold the bail 200 in position with respect to the electronic component 30.

In some embodiments, as illustrated in FIGS. 2A-2C, the bail 200 can be rotated in a downward direction to cause a rotation of the first and second cams 203, 204. The rotation of the first and second cams 203, 204 can impart a generally linear movement upon the slider 202, as the third cam 210 moves from a position within the relief 207 of the second cam 204 to a position outside of the relief 207. As the first and second cams 203, 204 rotate further, the second cam 204 can cause the slider 202 to further move in a linear direction away from the first cam 203. The second cam 204 can contact the outside surface of the third cam 210 and can move along the third cam 210 from the proximate edge 211 to the apex 212, thus imparting a further linear movement of the slider 202 (see, e.g., FIG. 2B). In addition, rotation of the first cam 203 (see, e.g., FIGS. 2D and 2E) from the retracted position (see, e.g., FIG. 2D) to the extended position (see, e.g., FIG. 2E) can impart a further movement to the slider 202. In some embodiments, the first cam 203 can impart a linear movement of approximately 0.2 mm to the slider 202. In some embodiments, the overall movement due to the combination of the first, second, and third cams 203, 204, 210 can impart a linear movement of approximately 2.0-2.2 mm to the slider.

FIGS. 4A-4D illustrate a three cam bail latch system coupled to an electronic component 30. In particular, FIG. 4C illustrates how a bail 200 and a slider 209 interface with an electronic component 30. FIGS. 4A, 4B, and 4D illustrate how the electronic component 30 couples to a port, or housing 400.

In some embodiments, FIGS. 4A and 4D illustrate that the generally linear movement of the slider 202 caused by the three cam system 20 can disconnect the electronic component 30 from the port, or housing 400. For example, the angled portion 214 of the slider 202 can contact the latch 215 such that further movement of the slider 202 can push the latch 215 around the boss 216. As a result, the electronic component 30 would no longer be securely fastened to the port 400 so that the electronic component 30 can be removed from the port 400.

FIGS. 5A and 5B illustrate the first cam physically separated from the pivot of the bail. In particular, in some embodiments the first cam 203 can linearly move forward the pivot a substantial amount.

FIG. 6 illustrates that the second cam 204 can be located above the apex 212 in the retracted position., Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A three cam bail latch system for disconnecting an electronic component from a port, said system comprising:
   a first cam;
   a second cam attached to the first cam, wherein the second cam defines a relief on an upper surface of the second cam;
   a third cam in contact with the second cam, wherein the third cam is configured to at least partially fit within the relief in a retracted position, and configured to be positioned out of the relief in an extended position;
   a bail coupled to the first cam; and
   a slider attached to the third cam at a proximate end of the slider;
   wherein the slider comprises an angled portion at a distal end of the slider that is adapted to contact a latch, and wherein the second cam is configured to move the third cam linearly.

2. A three cam bail latch for disconnecting an electronic component from a port, latch system comprising:
a first cam;
a second cam attached to the first cam, wherein the second cam defines a relief on an upper surface of the second cam; and
a third cam in contact with the second cam, wherein the third cam is configured to at least partially fit within the relief in a retracted position, and configured to be positioned out of the relief in an extended position;
wherein the third cam is attached to a slider, and wherein the second cam is configured to move the third cam linearly.

* * * * *

UNITED STATES PATENT AND TRADEMARK OFFICE
CERTIFICATE OF CORRECTION

PATENT NO.        : 7,306,473 B2                                    Page 1 of 13
APPLICATION NO.   : 11/142016
DATED             : December 11, 2007
INVENTOR(S)       : Yashar et al.

It is certified that error appears in the above-identified patent and that said Letters Patent is hereby corrected as shown below:

The title page showing the illustrative figure should be deleted to be replaced with the attached title page.

The drawing sheets, consisting of Figs. 1A-6, should be deleted to be replaced with the drawing sheets, consisting of Figs. 1A-6, as shown on the attached pages.

Figure 1B:
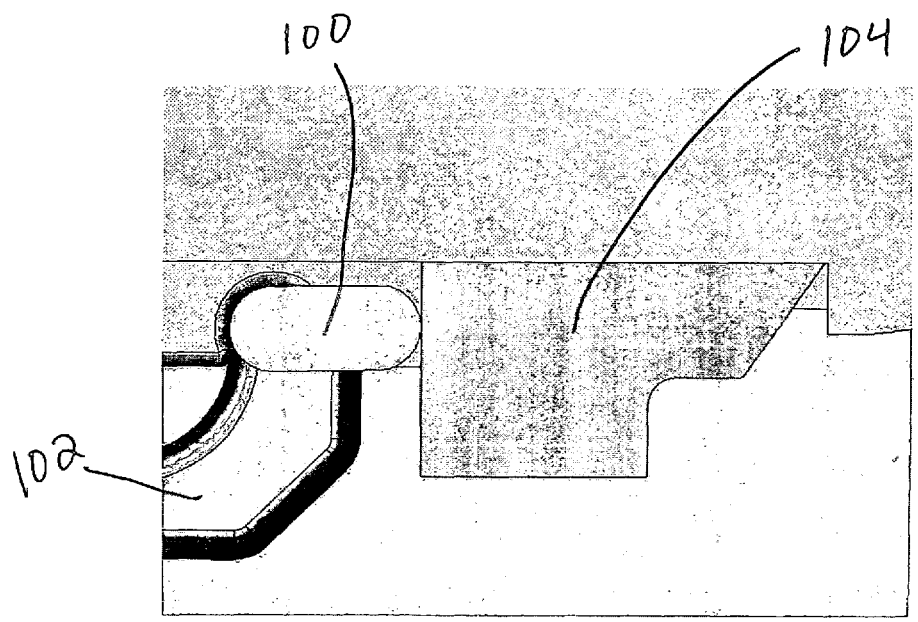
FIG. 1B illustrates a cross-sectional side view of a conventional cam system, including a conventional cam device and a conventional slider, in an extended or opened position, according to some aspects.

In FIGS. 1A-1B, please replace FIGS. 1A-1B with the enclosed replacement sheet corresponding to FIGS. 1A-1B.

In FIGS. 2A-2E, please replace FIGS. 2A-2E with the enclosed replacement sheets corresponding to FIGS. 2A-2E.

In FIGS. 3A-3C, please replace FIGS. 3A-3C with the enclosed replacement sheets corresponding to FIGS. 3A-3C.

In FIGS. 4A-4D, please replace FIGS. 4A-4D with the enclosed replacement sheets corresponding to FIGS. 4A-4D.

In FIGS. 5A-5B, please replace FIGS. 5A-5B with the enclosed replacement sheets corresponding to FIGS. 5A-5B.

In FIG. 6, please replace FIG. 6 with the enclosed replacement sheet corresponding to FIG 6.

Signed and Sealed this

Eleventh Day of August, 2009

David J. Kappos
*Director of the United States Patent and Trademark Office*

(12) United States Patent
Yashar et al.

(10) Patent No.: US 7,306,473 B2
(45) Date of Patent: Dec. 11, 2007

(54) THREE CAM BAIL LATCH DEVICE AND METHOD

(75) Inventors: Frank David Yashar, Sunnyvale, CA (US); John P. Wai, Los Altos, CA (US); Lin Zhang, Fremont, CA (US)

(73) Assignee: Opnext, Inc., Eatontown, NJ (US)

( * ) Notice: Subject to any disclaimer, the term of this patent is extended or adjusted under 35 U.S.C. 154(b) by 199 days.

(21) Appl. No.: 11/142,016

(22) Filed: May 31, 2005

(65) Prior Publication Data
US 2006/0269191 A1 Nov. 30, 2006

(51) Int. Cl.
H01R 13/627 (2006.01)
(52) U.S. Cl. .................................. 439/352; 439/372
(58) Field of Classification Search .......... 439/352, 439/372, 157, 356, 296, 160; 361/687, 728; 385/92, 76, 55
See application file for complete search history.

(56) References Cited
U.S. PATENT DOCUMENTS

| | | | |
|---|---|---|---|
| 6,494,623 B1 * | 12/2002 | Ahrens et al. | 385/76 |
| 6,644,991 B2 * | 11/2003 | Martin | 439/157 |
| 7,100,240 B2 * | 9/2006 | Amano | 16/303 |

* cited by examiner

Primary Examiner—Alexander Gilman
(74) Attorney, Agent, or Firm—Finnegan, Henderson, Farabow, Garrett & Dunner, L.L.P.

(57) ABSTRACT

The present invention provides a three cam bail latch system and a method for disconnecting an electronic component from a port using the three cam bail latch system.

2 Claims, 12 Drawing Sheets

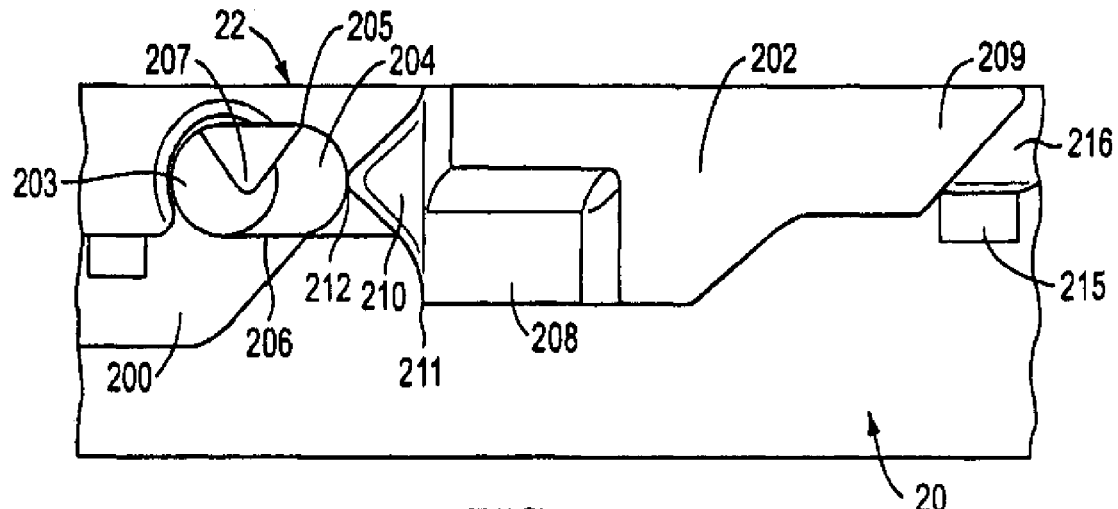

FIG. 2B